UNITED STATES PATENT OFFICE.

DOUGLAS FRANK TWISS, OF SUTTON COLDFIELD, ENGLAND, ASSIGNOR TO THE DUNLOP RUBBER COMPANY, LIMITED, OF WESTMINSTER, LONDON, ENGLAND.

VULCANIZATION OF RUBBER AND SIMILAR MATERIALS.

1,413,813.  Specification of Letters Patent.  Patented Apr. 25, 1922.

No Drawing.  Application filed March 7, 1919. Serial No. 281,230.

*To all whom it may concern:*

Be it known that I, DOUGLAS FRANK TWISS, a subject of the King of Great Britain, residing at Royal Road, Sutton Coldfield, in the county of Warwick, England, have invented certain new and useful Improvements in or Relating to the Vulcanization of Rubber and Similar Materials, of which the following is a specification.

In the specification of our prior application for Patent No. 1271810 we have described an accelerator for the vulcanization of rubber and similar materials consisting of caustic potash or soda dissolved in glycerol or glycol or other organic substance soluble in rubber, for the purpose of ensuring uniform distribution.

We have found that the caustic alkali can be introduced into the rubber mixing by the aid of other organic hydroxyl-compounds and according to this invention the accelerator consists of a solution of caustic alkali in a fluid or readily fusible organic aromatic hydroxy-compound. Phenol can be employed for this purpose, although solid at ordinary temperatures, as it is liquid at the temperature of mixing. The caustic alkali may be added to the solvent directly or the corresponding alkali metal may be dissolved to give a similar result. The compounds derived from the alkali metals and the aromatic hydroxy-compounds are generally soluble in an excess of the fluid or molten hydroxy-compound. The accelerating influence is due to the caustic alkali either present in the solution as such or formed from the compound of the hydroxy-compound and caustic alkali or caustic alkali metal, by the hydrolytic effect of traces of moisture present. Many hydroxy-compounds are capable of forming such derivatives but only those hydroxy-compounds are suitable for the present purpose, which are fluid or easily melted. Hydroxy-compounds possessing these characteristics would be capable of blending in at least small quantities with rubber during the usual mixing process and the dissolved alkali or derivative would thereby be distributed in a highly uniform manner throughout the rubber mass. By an easily melted substance, we mean one of which the temperature of fusion is below approximately 120° C. As a typical example of a solution in accordance with this invention, about 10 grs. of potassium hydroxide, or the equivalent quantity of metallic potassium in 100 grs. of phenol may be employed.

What I claim and desire to secure by Letters Patent of the United States, is:—

1. A method of accelerating the vulcanization of rubber and similar materials, which consists in adding to the rubber mixing a solution of caustic alkali in an aromatic hydroxy-compound.

2. A method of accelerating the vulcanization of rubber and similar materials which consists in adding to the rubber mixing a solution of caustic alkali in phenol.

3. A method of accelerating the vulcanization of rubber and similar materials which consists in adding to the rubber mixing an accelerator comprising the solution of an alkali metal in an aromatic hydroxy-compound.

4. A method of accelerating the vulcanization of rubber and similar materials which consists in adding to the rubber mixing an accelerator comprising the solution of an alkali metal in phenol.

DOUGLAS FRANK TWISS.